United States Patent
Deml et al.

(10) Patent No.: US 6,757,288 B1
(45) Date of Patent: *Jun. 29, 2004

(54) DEVICE AND METHOD FOR CONTROLLING A DATA TRANSMISSION OPERATION BETWEEN A FIRST ATM DEVICE AND A SECOND ATM DEVICE

(75) Inventors: Reinhard Deml, München (DE); Gunnar Boll, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,920

(22) PCT Filed: Nov. 24, 1998

(86) PCT No.: PCT/DE98/03461

§ 371 (c)(1),
(2), (4) Date: Jun. 6, 2000

(87) PCT Pub. No.: WO99/31922

PCT Pub. Date: Jun. 24, 1999

(30) Foreign Application Priority Data

Dec. 12, 1997 (DE) ......................... 197 55 373

(51) Int. Cl.[7] ............................................. H04L 12/56
(52) U.S. Cl. .................... 370/395.7; 370/413
(58) Field of Search .................... 370/395, 395.1, 370/395.7, 395.71, 395.72, 412, 413, 415, 417, 428, 429

(56) References Cited

U.S. PATENT DOCUMENTS 5,222,108 A * 6/1993 Suzuki ....................... 375/372
5,548,587 A  8/1996 Bailey et al.
5,991,295 A * 11/1999 Tout et al. ............... 370/395.7

FOREIGN PATENT DOCUMENTS

EP  0 492 440  7/1992

OTHER PUBLICATIONS

Siemens, Semiconductor Group, "ICs for Communications", Synchronous Digital Hierarchy Transceiver, PXB 4240, Oct. 1996, Order No. T4240–XV12–P1–7600, Version 1.2, 4 pages.
Data Sheet: MPC860SAR—"Functional Design Specification", Motorola, Jun. 1997, 3 pages.

* cited by examiner

*Primary Examiner*—Kwang Bin Yao
(74) *Attorney, Agent, or Firm*—Staas & Halsey LLP

(57) ABSTRACT

An ATM interface device (SS) that is connected via a first data bus (SAR_DAT) to a first ATM device (SAR) controlling a data transfer and via a second data bus (ATM_TDAT, ATM_RDAT) to a second ATM device (MUX) [sic] controlled by a data transfer is provided for a data transmission. The ATM interface device (SS) comprises a control module (CC) and two FIFO memories (T_FIFO, R_FIFO) for intermediate storage of data to be communicated.

11 Claims, 5 Drawing Sheets

Figure 1:
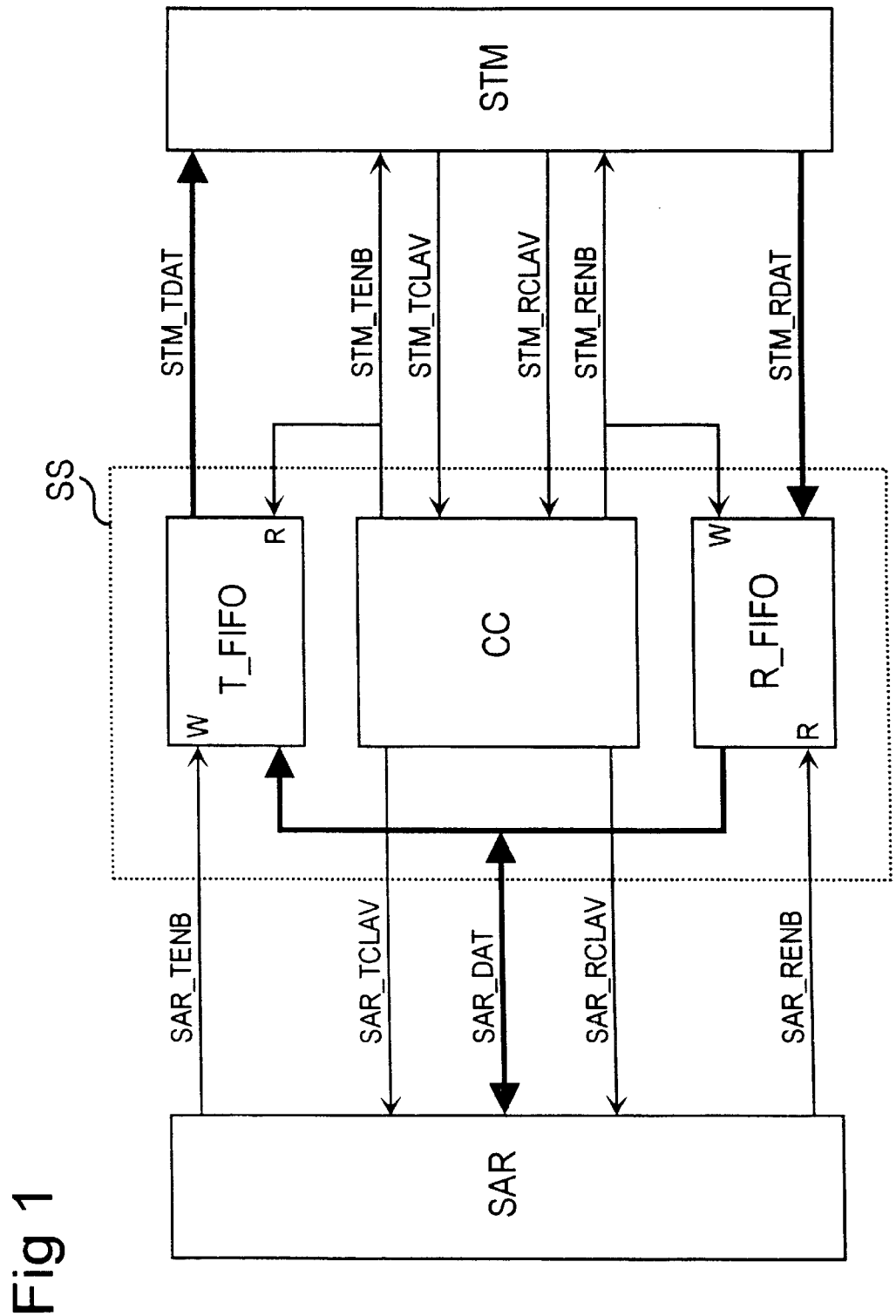

DEVICE AND METHOD FOR CONTROLLING A DATA TRANSMISSION OPERATION BETWEEN A FIRST ATM DEVICE AND A SECOND ATM DEVICE

The significance of transmission and switching technologies for high data transmission rates (greater than 100 Mbit/s) is increasing due to the increasing need for a transmission of video information in modern communications technology such as, for example, still and moving images in picture telephony applications or the display of high-resolution graphics at modem personal computers. The asynchronous transfer mode (ATM) is a known data transmission method for high data rates. A data transmission on the basis of the asynchronous transfer mode currently enables a variable transmission bit rate of up to 622 Mbit/s.

Known switching equipment, including those on the basis of the asynchronous transfer mode, are usually modularly constructed. A plurality of assemblies that, for example, realize an interface for the connection of subscriber lines, a central controller or a through-connection means can thereby usually be plugged onto a central plug assembly shared by all assemblies, what are referred to as a backplane, and are connected to one another thereover. The modularity of the switching equipment that is thereby achieved enables, among other things, an easy adaptation of a switching equipment to different configurations as well as a simplified error analysis when performing service [sic].

The data sheet "MPC860SAR—Functional Design Specification", Motorola, 6/97 discloses a control module MPC860SAR that comprises an 8-bit wide, bidirectional ATM-specific bus interface (UTOPIA interface: Universal Test & Operations PHY Interface for ATM), for example for a connection of an assembly to an ATM switching equipment. The known control module controls a data transfer that can be realized via a connectable data bus, i.e. this control module is a "master" module for the 8-bit wide data bus that can be connected to it.

The data sheet "ICs for Communication—PBX 4240", Siemens AG, 10/96, Order No. T4240-XV12-P1-7600, discloses a control module PXB 4240 that comprises two 8-bit wide, unidirectional ATM-specific bus interfaces (UTOPIA interfaces) and an STM-1 interface (Synchronous Transfer Mode with a transmission bit rate of 155 Mbit/s), for example for a connection of an optical fiber line. A conversion of an ATM data stream onto an STM data stream and vice versa can be realized with this module. This control module is thereby controlled by a data transfer implemented via one of the 8-bit wide data busses (UTOPIA interface), i.e. this control module is a "slave" module for the 8-bit wide data busses connectable to it.

EP 0 492 440 A1 discloses an ATM interface device via which a data communication between two ATM devices is realized upon intermediate storage of the communicated data in an FIFO memory (First In First Out). An inscription or, respectively, readout of data from the FIFO memory ensues with an activation of the FIFO memory by a read or, respectively, write signal sent from an ATM device.

The present invention is based on the object of specifying a method and an arrangement for a data transmission between a first ATM device configured as "master" and a second ATM device configured as "slave" with which differing data processing capacities of the first and of the second ATM device are compensated.

This object is inventively achieved with the features of patent claim 1 and 2 or, respectively, 7.

A time decoupling of the first data bus from the second data bus is realized by an interposition of an ATM interface device that is connected via a first data bus to the first ATM device and via a second data bus to the second ATM device, so that the first and the second data bus can be operated with a separate clock rate different from one another.

Fluctuations in the data transmission rate, which are particularly caused by the ATM communication technology, can be compensated by an intermediate storage of data to be communicated between the first and the second ATM device.

A further advantage of the invention is comprised therein that the ATM interface device can be realized both with a minimal HW outlay as well as with a simple software for the control of the data transfer.

Advantageous developments of the invention are explained in greater detail below on the basis of the drawing.

Figure 2:
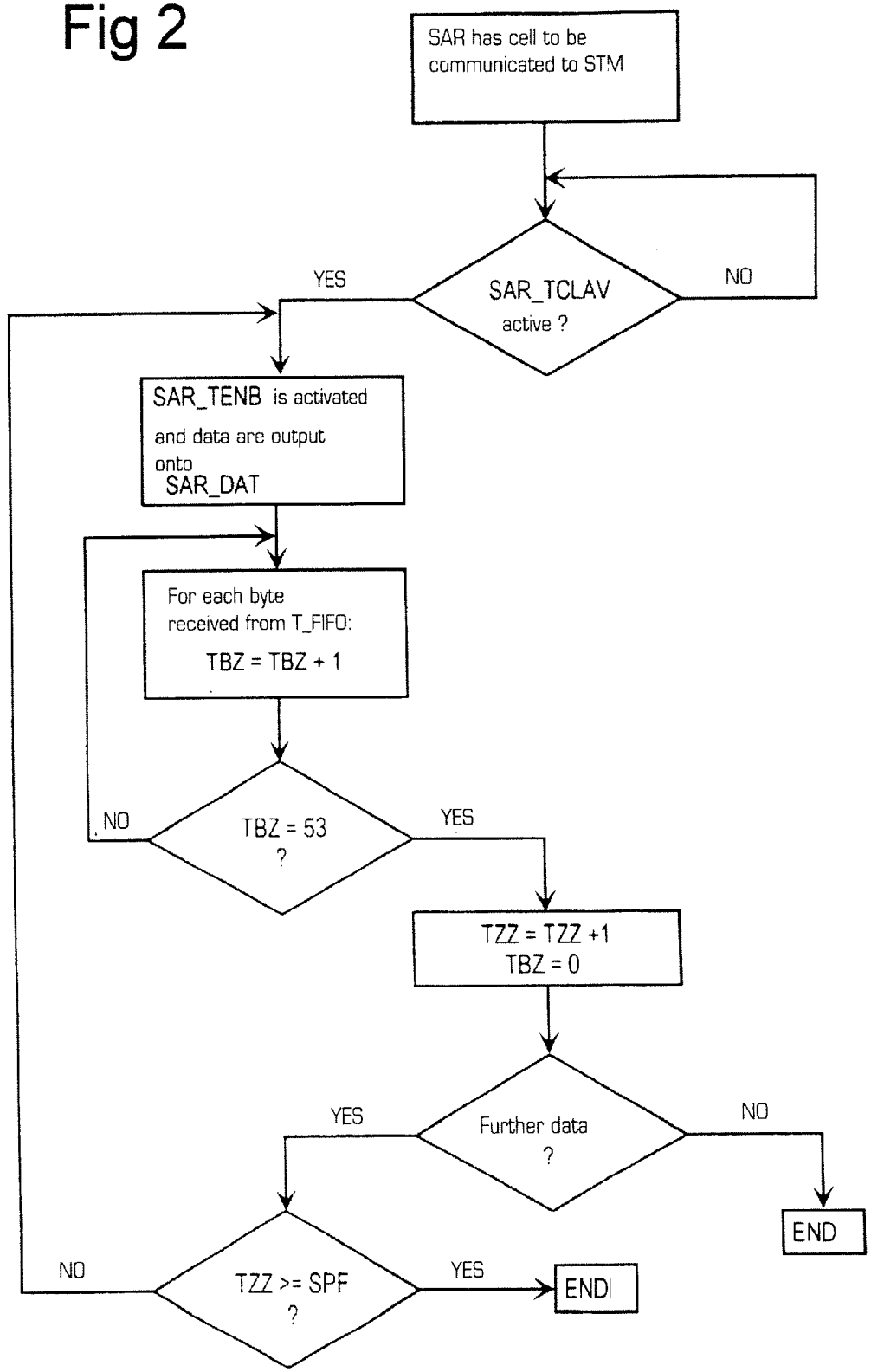
Figure 3:
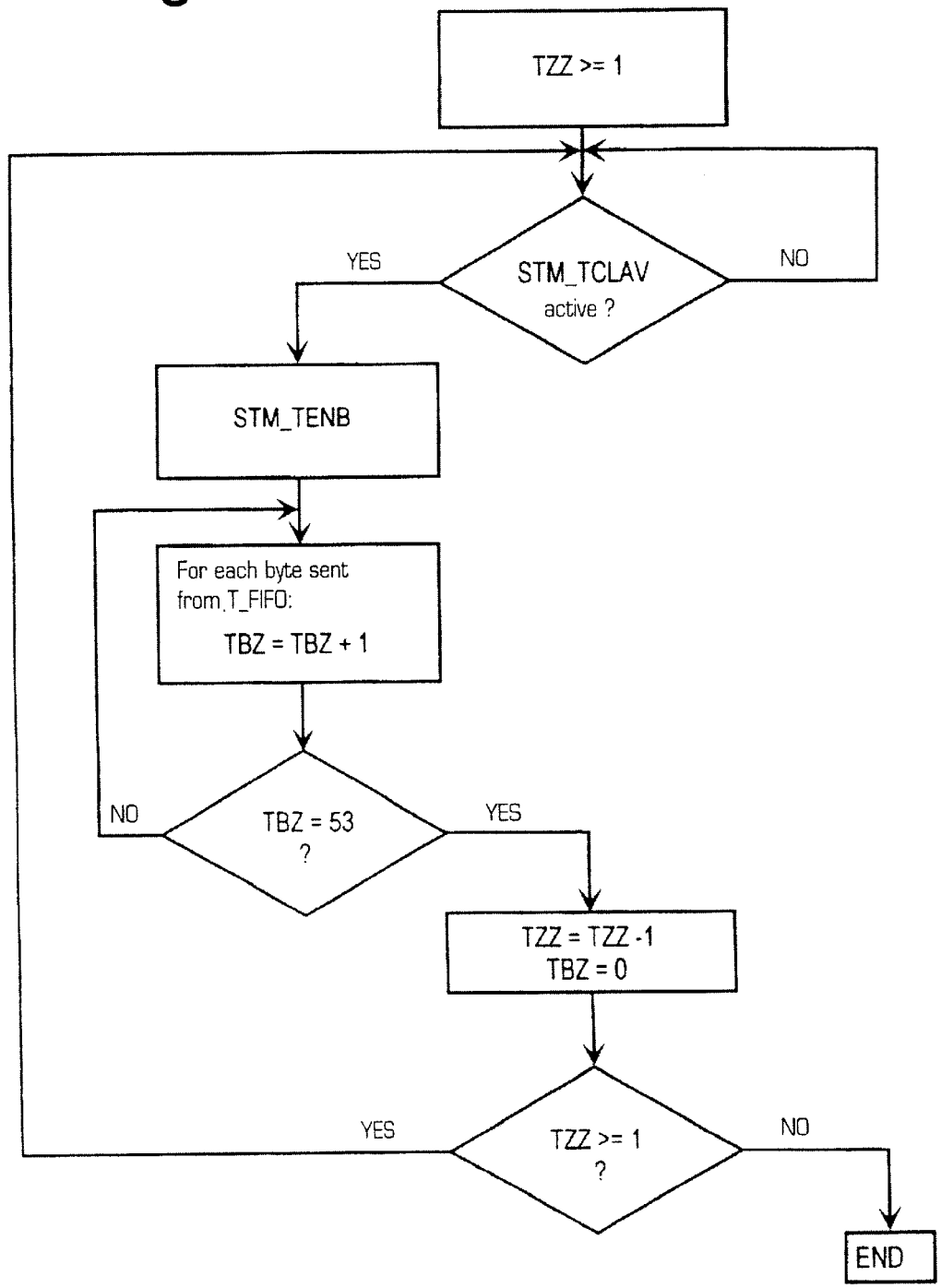
Figure 4:
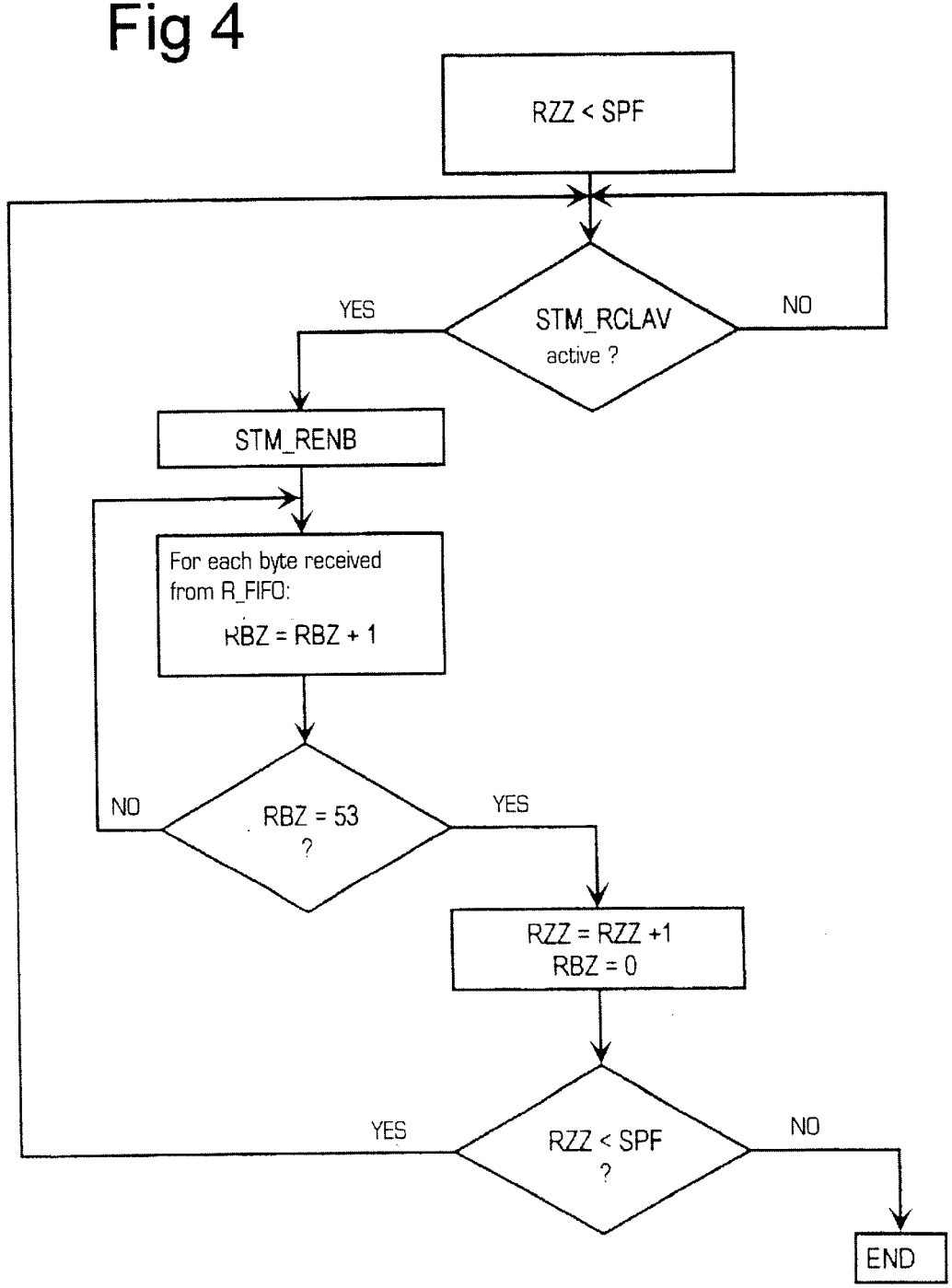
Figure 5:
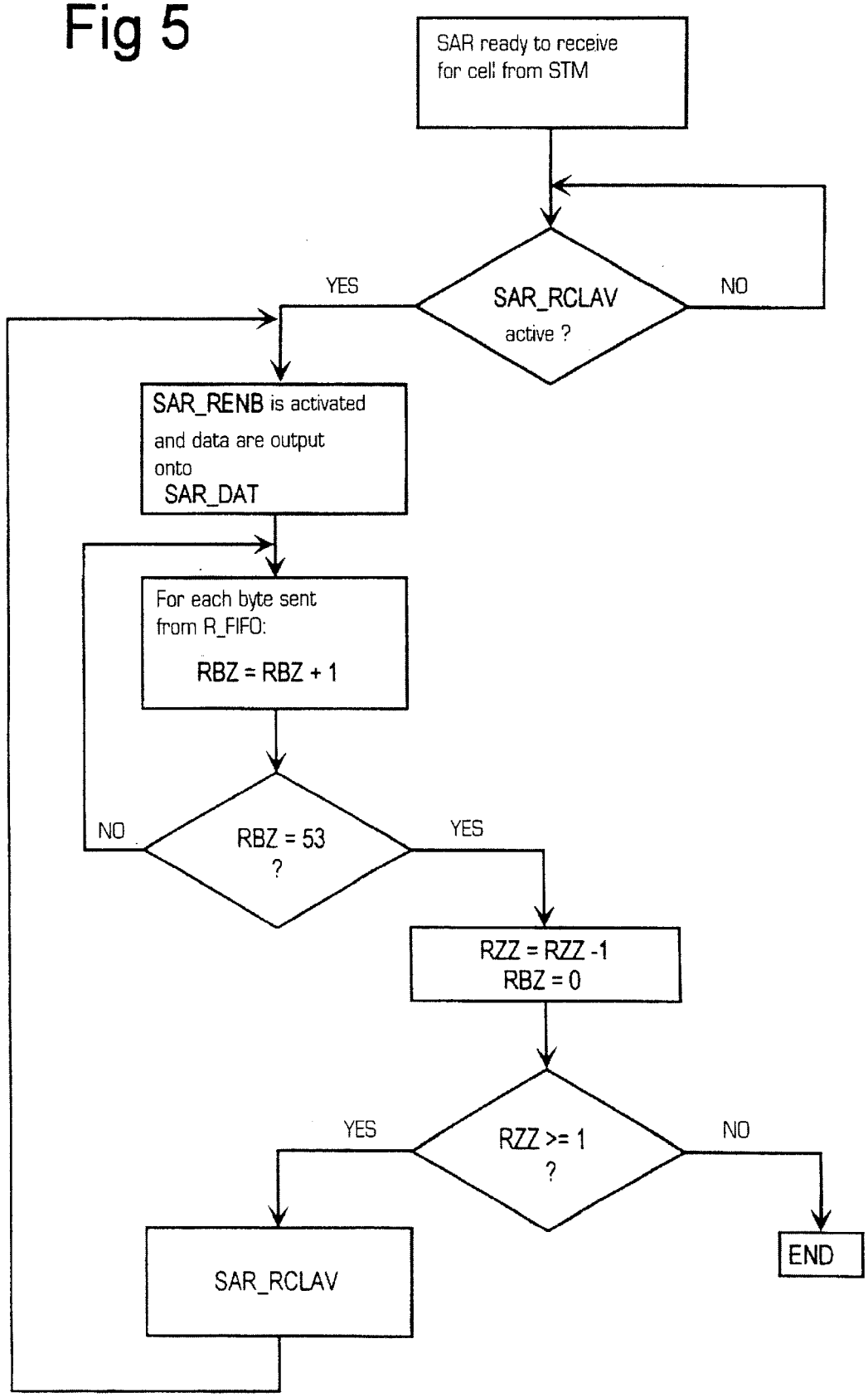

Thereby shown are:

FIG. 1 a structurgram related to the schematic illustration of the critical function units participating in the framework of a data transfer between a first ATM device and a second ATM device;

FIG. 2 a flowchart for a data transfer from a first ATM device to a first memory of the ATM interface device;

FIG. 3 a flowchart for a data transfer from a first memory of the ATM interface device to a second ATM device;

FIG. 4 a flowchart for a data transfer from a second ATM device to a second memory of the ATM interface device;

FIG. 5 a flowchart for a data transfer from a second memory of the ATM interface device to a first ATM device.

FIG. 1 shows a schematic illustration of the critical function units that participate in the framework of a data transfer between a first ATM device SAR and a second ATM device STM. The first ATM device SAR is connected to an ATM interface device SS via a first bidirectional data bus DAT_SAR operated with a first clock rate. The second ATM device STM is connected to the ATM interface device SS via a second and a third unidirectional data bus STM_TDAT; STM_RDAT operated with a second clock rate that differs from the first clock rate.

The ATM interface device SS comprises a control module CC, a first FIFO memory T_FIFO and a second FIFO memory R_FIFO (First In First Out). The first FIFO memory T_FIFO serves for an intermediate storing of data to be communicated from the first ATM device SAR to the second ATM device STM. The second FIFO memory R_FIFO serves for an intermediate storing of data to be communicated from the second ATM device STM to the first ATM device SAR. The control module CC determines the memory filling levels of the first FIFO memory T_FIFO and of the second FIFO memory R_FIFO.

When an adjustable memory filling value SPF of the first FIFO memory T_FIFO has not been exceeded, the control module CC signals a free memory capacity of the first FIFO memory T_FIFO to the first ATM device SAR with a first receiver status information SAR_TCLAV. When data to be communicated to the first ATM device SAR are intermediately stored in the second FIFO memory R_FIFO, the control module CC signals this to the first ATM device SAR with a second sender status information SAR_RCLAV.

The first FIFO memory T_FIFO and the second FIFO memory R_FIFO respectively comprise a first memory control input W at the input side and a second memory control input R at the output side. When the first memory control input W of a FIFO memory T_FIFO, R_FIFO is activated by a write signal SAR_TENB, STM_RENB, the FIFO memory T_FIFO, R_FIFO reads data received via a databus SAR_DAT, STM_RDAT connected to the FIFO memory T_FIFO, R_FIFO at the input side and stores these. When the second memory control input R of a FIFO memory T_FIFO, R_FIFO is activated by a read signal STM_TENB, SAR_RENB, the FIFO memory T_FIFO, R_FIFO reads the intermediately stored data out and outputs these onto a data bus STM_TDAT, SAR_DAT connected to the FIFO memory T_FIFO, R_FIFO at the output side.

When the second ATM device STM can receive data from the first ATM device SAR, it signals this with a second receiver status information STM_TCLAV to the control module CC. When the second ATM device STM has data to be communicated to the first ATM device SAR, it signals this with a first sender status information STM_RCLAV to the control module CC.

Before the other Figures are discussed in greater detail, it seems appropriate for a better understanding thereof to briefly present the basic structure of an ATM message. Data packets of fixed length, what are referred to as cells, are employed for the data transport in the transmission method known as asynchronous transfer mode (ATM). An ATM cell is composed of a cell header, what is referred to as the "header" that is five bytes long and contains the switching data relevant for the transport of an ATM cell and of a payload data field, what is referred to as the "payload", that is 48 bytes long.

FIG. 2 shows a flowchart for a data transfer from the first ATM device SAR to the first FIFO memory T_FIFO. When the first ATM device SAR has an ATM cell to be communicated to the second ATM device STM, the first ATM device SAR checks whether the first receiver status information SAR_TCLAV is active, i.e. the first FIFO memory T_FIFO has free memory capacity. The control module CC activates the first receiver status information SAR_TCLAV when a memory-individual cell counter TZZ that signals the plurality of cells stored in the first FIFO memory T_FIFO is lower than a pre-adjustable memory filling value SPF. When the first receiver status information SAR_TCLAV is active, the first ATM device SAR activates the first memory control input W of the first FIFO memory T_FIFO with the write signal SAR_TENB and outputs the ATM cell to be transmitted byte-by-byte onto the first data bus SAR_DAT connecting the first ATM device SAR to the first FIFO memory T_FIFO and the second FIFO memory R_FIFO. As long as the first memory control input W of the first FIFO memory T_FIFO is activated, the first FIFO memory T_FIFO reads data received via the first data bus SAR_DAT and stores these.

A memory-individual byte counter TBZ is incremented by the value 1 for each byte read by the first FIFO memory T_FIFO. When the memory-individual byte counter TBZ reaches the value 53, i.e. 53 bytes (corresponding to an ATM cell) have been communicated from the first ATM device SAR to the first FIFO memory T_FIFO, the memory-individual cell counter TZZ is incremented by the value 1, and the memory-individual byte counter TBZ is reset to the value 0.

When the first ATM device SAR has a further ATM cell to be communicated to the second ATM device STM, the first ATM device SAR checks whether the first receiver status information SAR_TCLAV continues to be active, i.e. the memory-individual cell counter TZZ continues to be lower then the adjustable memory filling value SPF and continues the process as warranted.

FIG. 3 shows a flowchart for a data transfer from the first FIFO memory T_FIFO to the second ATM device STM. When data to be communicated to the second ATM device STM are intermediately stored in the first FIFO memory T_FIFO, i.e. the memory-individual cell counter TZZ is higher than or equal to the value 1, the control module CC checks whether the second sender status information STM_TCLAV is active, i.e. whether the second ATM device STM can receive data from the first ATM device SAR. When this is the case, the control module CC activates the second memory control input R of the first FIFO memory T_FIFO and the second ATM device STM with a read signal STM_TENB. As long as the second memory control input R of the first FIFO memory T_FIFO is activated, the first FIFO memory T_FIFO outputs data byte-by-byte onto the second data bus STM_TDAT connecting the first FIFO memory T_FIFO to the second ATM device STM, these being read therefrom by the second ATM device STM.

The memory-individual byte counter TBZ is incremented by the value 1 for each byte sent from the first FIFO memory T_FIFO. When the memory_individual byte counter TBZ reaches the value 53, i.e. 53 bytes have been communicated from the first FIFO memory T_FIFO to the second ATM device STM, the memory-individual cell counter TZZ is deincremented by the value 1, and the memory-individual byte counter TBZ is reset to the value 1. In a next step, the control module CC checks whether a further ATM cell is stored in the first FIFO memory T_FIFO, i.e. the memory-individual cell counter TZZ continues to be greater than or equal to the value 1. When this is the case, the control module CC checks again whether a second receiver status information STM_TCLAV is activer and continues the process as warranted.

FIG. 4 shows a flowchart for a data transfer from the second ATM device STM to the second FIFO memory R_FIFO. When the second FIFO memory R_FIFO has free memory capacity, i.e. a memory-individual cell counter RZZ that signals the plurality of cells stored in the second FIFO memory R_FIFO is lower than the adjustable memory filling value SPF, the control module CC checks whether the first sender status information STM_RCLAV is active, i.e. whether the second ATM device STM has data to be communicated to the first ATM device SAR. When this is the case, the control module CC activates the first memory control input W of the second FIFO memory R_FIFO and the second ATM device STM with a write signal STM_RENB. As long as the first memory control input W of the second FIFO memory R_FIFO is activated, the second FIFO memory R_FIFO reads data that are received via the third data bus STM_RDAT connecting the second ATM device STM to the second FIFO memory R_FIFO and that are output onto the third data bus STM_RDAT by the second ATM device STM as a result of the write signal STM_RENB and stores these.

A memory-individual byte counter RBZ is incremented by the value 1 for each byte read by the second FIFO memory R_FIFO. When the memory-individual byte counter RBZ reaches the value 53, i.e. 53 bytes were communicated from the second ATM device STM to the second FIFO memory R_FIFO, the memory-individual cell counter RZZ is incremented by the value 1, and the memory-individual byte counter RBZ is reset to the value 0. In a next step, the control module CC checks whether further memory capacity is present in the second FIFO memory R_FIFO, i.e. the memory-individual cell counter RZZ continues to be lower than the adjustable memory filling value SPF. When this is the case, the control module CC checks anew whether a first sender status information STM_RCLAV is active, i.e. whether the second ATM device STM has further data to be communicated to the first ATM device SAR and continues the process as warranted.

FIG. 5 shows a flowchart for a data transfer from the second FIFO memory R_FIFO to the first ATM device SAR. When the first ATM device SAR can receive an ATM cell from the second ATM device STM, the first ATM device SAR checks whether the second sender status information SAR_RCLAV is active, i.e. whether at least one ATM to be communicated to the first ATM device SAR is intermediately stored in the second FIFO memory R_FIFO. The control module CC activates the second sender status information SAR_RCLAV when the memory-individual cell counter RZZ is greater than or equal to the value 1. When the second sender status information SAR_RCLAV is active, the first ATM device SAR activates the second memory control input R of the second FIFO memory R_FIFO with the read signal SAR_RENB. As long as the second memory control input R of the second FIFO memory RFIFO is activated, the second FICO memory R_FIFO outputs data byte-by-byte onto the first data bus SAR_DAT, from which they are read by the first ATM device SAR.

The memory-individual byte counter RBZ is incremented by the value 1 for each byte sent from the second FIFO memory RFIFO. When the memory-individual byte counter RBZ reaches the value 53, i.e. 53 bytes were communicated from the second FIFO memory R_FIFO to the first ATM device SAR, the memory-individual cell counter RZZ is deincremented by the value 1 and the memory-individual byte counter RBZ is reset to the value 0. In a next step, the control module CC checks whether a further ATM cell is stored in the second FIFO memory R_FIFO, i.e. the memory-individual cell counter RZZ continues to be greater than or equal to the value 1. When this is the case, the control module CC activates the second sender status information STM_RCLAV, so that the first ATM device SAR can initiate a further data transfer.

What is claimed is:

1. A method for a data transmission from a first ATM device controlling said data transmission to a second ATM device controlled by said data transmission via an ATM interface device having a control module, comprising:

communicating, by said control module a first receiver status information for signaling free memory capacity of a memory of said ATM interface device to said first ATM device, activating a first memory control input of said memory by said first ATM device, and outputting said data to be communicated by said first ATM device onto a first data bus connecting said first ATM device to said memory, said activating a first memory control input end of outputting said data being performed when said first ATM device has data to be communicated to said second ATM device and said memory has free memory capacity;

intermediately storing, by said memory, data received via said first data bus as long as of said first memory control input is activated;

communicating a second receiver status information for signaling a readiness to receive data from said second ATM device to said control module;

activating, by said control module, a second memory control input of said memory when data to be communicated to said second ATM device are intermediately stored in said memory; and outputting, by said memory, said intermediately stored data onto a second data bus that connects said memory to said second ATM device as long as said second memory control input is activated.

2. A method for a data transmission from a second ATM device controlled by said data transmission to a first ATM device controlling said data transmission via an ATM interface device, comprising:

communicating a first sender status information for signaling a presence of data to be communicated to said first ATM device from said second ATM device to a control module of said ATM interface device;

activating, by said control module, a first memory control input of a memory of said ATM interface device and said second ATM device when said memory of said ATM interface device has free memory capacity;

outputting, by said second ATM device, said data to be communicated onto a second data bus connecting said second ATM device to said memory, as long as said second ATM device is activated;

intermediately storing data received via said second data bus by said memory, as long as said first memory control input is activated;

communicating a second sender status information for signaling a presence of intermediately stored data in said memory to said first ATM device by said control module;

activating a second memory control input of said memory by said first ATM device, when said first ATM device is ready for a data reception; and outputting said intermediately stored data from said memory onto a first data bus connecting said memory to said first ATM device, as long as said second memory control input is activated.

3. A method according to claim 1, further comprising:

modifying a memory-individual data word counter by a first value for each data word received by said memory; and modifying a data packet counter by a second value when said memory-individual data word counter reaches an adjustable limit value.

4. A method according to claim 1, further comprising the stops modifying a memory-individual data word counter by a first value for each data word sent from said memory; and modifying a data packet counter by a second value when said memory-individual data word counter reaches an adjustable limit value.

5. A method according to claim 3, further comprising:

signaling, by said memory, a readiness to receive data as soon as said data packet counter is lower than an adjustable, upper memory filling value of said memory.

6. A method according to claim 4, further comprising:

signaling, by said memory, a transmission readiness for data as soon as said data packet counter is greater than or equal to an adjustable, lower memory filling value of said memory.

7. An ATM interface device comprising:

at least one first data bus connected to a first ATM access control device controlling a data transfer;

at least one second data bus connected to a second ATM access control device controlled by a data transfer;

a first memory for intermediate storage of data to be communicated from said first ATM access control device to said second ATM access control device;

a second memory intermediately storing data to be communicated from said second ATM access control device to said first ATM access control device;

a control module determining free memory capacity of said first memory and of said second memory and communicating:

a receiver status information for a signaling a free memory capacity of said first memory to said first access control device, a sender status information to said first access control device signaling a presence of data to be communicated from said second memory to said first access control device, a read signal to said first memory, and a write signal to said second memory, said first memory comprising:

a first memory control input that is driven by said first access control device such that, given activation of said first memory control input, a storing of data communicated from said first access control device ensues, and a second memory control input that is driven by said the read signal of said control module such that, given activation of said second memory control input, a communication of data stored in said first memory ensues to said second access control device, said second memory comprising:

a first memory control input that is driven by said write signal of said control module such that, given activation of said first memory control input, a writing of data communicated from said second access control device ensues, and a second memory control input that is driven by said first access control device such that, given activation of said second memory control input, a communication of data stored in said second memory ensues to said first access control device.

8. An ATM interface device according to claim 7, wherein said first memory and said second memory are first-in-first-out memories.

9. Space a method according to claim 2, further comprising:

modifying a memory-individual data word counter by a first value for each data word received by said memory; and modifying a data packet counter by a second value when said memory-individual data word counter reaches an adjustable limit value.

10. A method according to claim 2, further comprising:

modifying a data packet counter by a second value when said memory-individual data word counter reaches an adjustable limit value.

11. Space a method according to claim 10, further comprising:

signaling, by said memory, a transmission readiness for data as soon as said data packet counter is greater than or equal to an adjustable, lower memory filling value of said memory.

* * * * *